United States Patent [19]

Miller et al.

[11] Patent Number: 5,702,830
[45] Date of Patent: Dec. 30, 1997

[54] MAGNETO-OPTICAL RECORDING MATERIALS SYSTEM

[75] Inventors: Joseph Miller; Derek P. A. Pearson, both of Reading; Philip G. Pitcher, Alton, all of United Kingdom

[73] Assignee: Johnson Matthey Public Limited Company, London, England

[21] Appl. No.: 367,192

[22] PCT Filed: Jul. 26, 1993

[86] PCT No.: PCT/GB93/01575

§ 371 Date: Jan. 13, 1995

§ 102(e) Date: Jan. 13, 1995

[87] PCT Pub. No.: WO94/02940

PCT Pub. Date: Feb. 3, 1994

[30] Foreign Application Priority Data

Jul. 28, 1992 [GB] United Kingdom ............... 9216074

[51] Int. Cl.[6] ................................................ G11B 5/66
[52] U.S. Cl. ................ 428/611; 428/635; 428/668; 428/670; 428/694 TM; 428/694 MM; 428/694 EC; 428/900; 428/928; 369/13
[58] Field of Search ........................ 428/611, 635, 428/668, 670, 694 TM, 694 MM, 900, 928, 694 EC; 369/13

[56] References Cited

U.S. PATENT DOCUMENTS

| 5,068,022 | 11/1991 | Carcia | 204/192.15 |
|---|---|---|---|
| 5,082,749 | 1/1992 | Carcia | 428/699 |
| 5,087,532 | 2/1992 | Challener, IV | 428/694 |
| 5,106,703 | 4/1992 | Carcia | 428/635 |
| 5,109,375 | 4/1992 | Greidanus et al. | 369/13 |
| 5,239,534 | 8/1993 | Matsumoto | 369/288 |
| 5,462,811 | 10/1995 | Miyamoto et al. | 428/694 EC |

FOREIGN PATENT DOCUMENTS

| 0304873 | 3/1989 | European Pat. Off. |
|---|---|---|
| 0549246 | 6/1993 | European Pat. Off. |
| 3235237 | 10/1991 | Japan . |
| 3157838 | 9/1993 | Japan . |
| 2234842 | 2/1991 | United Kingdom . |
| 2234843 | 2/1991 | United Kingdom . |

OTHER PUBLICATIONS

Journal of Applied Physics, vol. 67, No. 9, 1 May 1990 pp. 4409–4414, C. J. Lin 'Critical assessment of the physics underlying direct overwrite in magneto-optic recording'.

Tsutsumi et al, "Direct overwrite in magneto-optic recording", Journal of Magnetism and Magnetic Materials, 118 Jan. (1993), Elsevier Science Publishers B.V., pp.231–247.

Lin, "Critical assessment of the physics underlying direct overwrite in magneto-optic recording (invited)", Journal of Applied Physics, 67 (9), 1 May 1990, American Institute of Physics, pp. 4409–4414.

Kobayashi et al, "Magnetization Process of Exchange-Coupled Ferrimagnetic Double-Layered Films", Japanese Journal of Applied Physics, vol. 20, No. 11, Nov., 1981, pp. 2089–2095.

*Primary Examiner*—Stevan A. Resan
*Attorney, Agent, or Firm*—Watson Cole Stevens Davis, P.L.L.C.

[57] ABSTRACT

A materials system in which exchange coupling is achievable has the potential for allowing direct overwriting of data and comprises at least two multilayer films of platinum and cobalt with independently controlled coercivity and Curie temperatures.

29 Claims, 5 Drawing Sheets

MAGNETO-OPTICAL RECORDING MATERIALS SYSTEM

CROSS REFERENCE TO RELATED APPLICATION

The present application was filed as PCT International application Ser. No. PCT/GB93/01575, international filing date Jul. 26, 1993.

FIELD OF THE INVENTION

This invention relates to a platinum/cobalt materials system for use in magneto-optical recording, and especially to a system, comprising a plurality of platinum/cobalt multilayers, which is suitable for use in direct overwrite operations with laser power modulation.

BACKGROUND OF THE INVENTION

Magneto-optical (MO) materials comprising multilayer films of platinum and cobalt have not yet reached the stage of commercial production, mostly because until recently it had seemed to be impossible to achieve the necessary characteristics in a Pt/Co multilayer. It has long been appreciated, however, that a successful Pt/Co MO material would offer a range of advantages over the dominant commercial material, amorphous rare earth transition metal (RE-TM) alloy films. European patent application, publication number 0 549 246 A2, describes a Pt/Co multilayer film materials system having necessary requirements of a MO-recording material, including sufficient room temperature coercivity, $H_c$, perpendicular magnetic anisotropy, a square polar Kerr hysteresis loop, and a sufficient polar Kerr rotation. Once commercialised, such a Pt/Co system could become the dominant commercial product in this field. However, as aforementioned, it was thought that the necessary properties could not be achieved in a Pt/Co system, and work has continued towards improving RE-TM films.

Particularly interesting is the work which has been done towards the development of "direct overwrite" (DOW) RE-TM systems. Conventionally, when new data is written to MO films, previously-written data is completely erased prior to writing of the new data. This two-step process is time-consuming and of course a one-step process wherein no separate erasure of previously-written information is necessary would be extremely advantageous. No such product has yet been made commercially available.

One type of laser-power modulated direct overwrite RE-TM film which has been investigated typically contains at least two magneto-optic layers with separately-controlled magnetic properties; one layer, hereinafter referred to as the "memory layer", having a relatively high room temperature coercivity and a relatively low Curie temperature is used to store the written data, and the other, hereinafter referred to as the "reference layer", having a relatively low room temperature coercivity and a relatively high Curie temperature. Lin (J. Appl. Phys. 67 (9), 1 May 1990) discusses the requirements of such a bilayer. The scheme he discusses requires two permanent magnetic fields; one ($H_b$) is used together with laser beam heating for writing domains, and the other ($H_{ini}$) is used to reset the reference layer to the erased state (in which the magnetisation is in the reverse direction to the "written" state) at ambient temperature without disturbing domain walls in the memory layer. At room temperature, $H_c$ (memory layer) $>H_{ini}>H_c$ (reference layer); $H_b<H_{ini}$; $H_c$ (reference layer) $>H_b>H_c$ (memory layer). Direct overwrite is accomplished by modulating the writing laser beam at high power ($P_H$) and low power ($P_L$) levels according to the data stream. The MO material is exposed in rotation to $H_{ini}$ and $H_b$ at $P_H$ or $P_L$. At $P_H$, wherein both layers are heated to a temperature above $T_c$ of the reference layer, $H_b$ causes domain patterns to be created in the reference layer. Subsequently, these domain patterns are copied (at what is known as "the copying temperature") to the memory layer through exchange coupling upon cooling. Exposure to $H_{ini}$ at ambient temperature then causes the domains in the reference layer to be erased such that the written domains are confined only to the memory layer while the reference layer is again ready for new domains to be written. At $P_L$, wherein both layers are heated to a temperature above $T_c$ of the memory layer but significantly below $T_c$ of the reference layer, exposure to $H_b$ does not permit writing in the reference layer, whose domains therefore remain unaltered. On cooling, the magnetic dipoles in the memory layer become aligned (at the copying temperature) parallel to those in the reference layer through exchange coupling, and the domains in the memory layer are thus erased.

An aim of the present invention is to produce a similar type of system comprising at least two magneto-optic layers each comprising a Pt/Co multilayer.

As stated hereinabove, no direct overwrite (DOW) system is yet commercially available. Even if a commercial RE-TM DOW film were to be developed, there are a number of well known disadvantages associated with the use of RE-TM materials, such as poor corrosion resistance and easy oxidation necessitating the use of passivating underlayers and overcoats, and small polar Kerr rotation at short wavelengths which prevents their use for high density recording with shorter wavelength or "blue" lasers. The development of a direct-overwrite Pt/Co system is obviously highly desirable.

As indicated by Lin (referenced above) a laser-modulated direct overwrite system requires the use of MO materials which satisfy certain requirements for coercivity, Curie temperature, and exchange coupling between layers. Whereas attainment of the desired $H_c$ and $T_c$ differentials between the memory and reference layers are easily obtainable in RE-TM materials, this has not been the case for Pt/Co systems.

Theoretically, the thermomagnetic characteristics of a Pt/Co multilayer may be controlled, for example, by adjusting the thicknesses of the individual layers in the multilayer stack, and/or by adjusting the total height of the multilayer stack, ie the total number of "periods" comprising the stack. (One period comprises one individual layer of platinum and one individual layer of cobalt.) Increasing the total percentage of the platinum and cobalt which is platinum lowers the Curie temperature of the Pt/Co multilayer stack, whereas increasing the height of the multilayer stack (for constant platinum percentage) should increase the Curie temperature of the Pt/Co multilayer stack up to a limit. However, to our knowledge no-one has yet been able to demonstrate Curie temperature control as a function of total number of stack periods. In the course of making the present invention, we have in fact been able to control Curie temperature, as is demonstrated in Example 1 herein.

Without achievement of control of $H_c$ and $T_c$ the fabrication of a system having a plurality of MO layers each with independent magneto-optical properties, is not possible. The considerable difficulties and seeming impossibility of achieving the necessary requirements in a simple Pt/Co multilayer stack system have lead researchers in the field to look to other materials for inclusion in a Pt/Co system. This complicates the system itself and its manufacture, and may cause variations in the other properties of the films.

For example, JP 3,235,237A discloses two vertically-magnetising layers having different magnetic properties, which layers are magnetically combined and laminated. In an example, the MO material comprises a first magnetic layer of Pt and $Fe_{70}Co_{30}$, and a second magnetic layer of Pd/Co. A complex materials system is involved, and controlled deposition of four elements is required. It is generally accepted that the use of Pd/Co instead of Pt/Co, or the inclusion of iron, will undesirably reduce a system's polar Kerr effect.

SUMMARY OF THE INVENTION

The Applicants of the present invention have aimed to produce a system comprising multilayers of Pt and Co only, and have been able to maintain within a satisfactory range, the desired $T_c$ of each of two Pt/Co multilayers while adjusting as necessary their $H_c$'s, in order to provide a simple Pt/Co multilayer MO system having two layers with properties required for direct overwriting of data with laser power modulation.

Despite much interest and research effort in the MO industry in recent years, this is the first time a simple Pt/Co stacked multilayer system with independently controlled $H_c$ and $T_c$ has been achieved. Such an achievement is an extremely significant and important step forward in the quest for a practical DOW Pt/Co system.

Accordingly, this invention provides a materials system suitable for magneto-optical recording and having the potential to allow direct overwriting of data, comprising a substrate material and at least two multilayer films of platinum and cobalt wherein there is provided at a multilayer interface a spacer comprising a Pt layer of one or both multilayers or a separately-deposited material, one of said multilayer films having a relatively high room temperature coercivity ($H_c$) and a low Curie temperature ($T_c$) and known as the memory layer and one of said multilayer films having a relatively low room temperature coercivity and a high Curie temperature and known as the reference layer, the differences in coercivity and Curie temperature between the two multilayer films being sufficient to permit a direct overwriting process.

Actual direct overwriting processes require, in addition to the necessary $H_c$ and $T_c$ properties, perpendicular magnetic anisotropy two layers to be exchange coupled (see Tsutsumi et al, J. Magn. & Mag. Mat 118 (1993) 231–247; Lin, J. Appl. Phys. 67 9), 1 May 1990; Kobayashi et al, Jap. J. App. Phys., Vol 20, No 11, Nov. 1981, pp 2089–2095). Control of pma and/or the exchange coupling strength is achievable in films according to the present invention through for example adjustment of spacer thickness and control of process parameters during fabrication of the MO system.

Accordingly therefore, this invention also provides a materials system suitable for MO recording and having the potential to allow direct overwriting of data, comprising the materials system of the present invention wherein multilayer films of platinum and cobalt are exchange coupled and have perpendicular magnetic anisotropy.

BRIEF DESCRIPTION OF THE DRAWINGS

In the materials systems of the present invention, the material which separates the last Co layer in one multilayer (the (n−1)th multilayer) from the first Co layer in the next, the nth, multilayer, is known as the spacer. Where there is no separately deposited spacer, adjacent multilayers are separated by a Pt layer of one or both adjacent multilayers, ie, the Pt from one or both of said multilayers forms the spacer. Whether or not the spacer comprises a Pt layer from one or both of said multilayers, a separately deposited spacer structure may be provided at any or each multilayer interface. Conveniently the spacer structure is of platinum but may be of other metals or dielectric materials such as silicon nitride, or a combination of materials. Hereinafter, in this application, spacer is defined as that material which separates the last Co layer in the (n−1)th multilayer from the first Co layer in the nth multilayer, whether or not said spacer is deposited as a part of any multilayer.

Optionally, there may be a platinum or other metal or dielectric material or combination of materials interlayer between the substrate and the adjacent Pt/Co multilayer film. Preferably the interlayer is of platinum.

Values for $H_c$ and $T_c$ of the memory and reference layers in RE-TM DOW films have been investigated, eg by Lin (referenced above). Obviously, no-one has been able to quantify actual $H_c$ and $T_c$ values for Pt/Co direct overwrite systems. Therefore, for the purposes of the present invention we have defined what in our opinion would be required in terms of $H_c$ and $T_c$ of the memory and reference layers such that the $H_c$ and $T_c$ differences between the two layers would be considered as being sufficient to permit a direct overwriting process. The equation below is taken from Kobayashi, referenced above.

For the purposes of this invention therefore, and in order to define potential for DOW, $H_c$ of the memory layer may be in the range 2 to 15 kOe such as 3–10 kOe or 3–8 kOe while $H_c$ of the reference layer may be in the range 0.5 to 10 kOe, such as 1.0 to 6 kOe or 1.5 to 4 kOe provided that the $H_c$ (memory layer) minus $H_c$ (reference layer) is greater than, $$\sigma_w/[2M_s(\text{memory layer}) \, h(\text{memory layer})] \sigma_w/[2M_s(\text{reference layer}) \, h(\text{reference layer})];$$

wherein $\sigma_w$, is the exchange coupling strength, $M_s$ is the saturation magnetisation and h is the multilayer thickness; $T_c$ of the memory layer is preferably 100° C. to 400° C. such as 150° C. to 300° C. or 150° C. to 200° C. and $T_c$ of the reference layer is preferably 175° C. to 500° C. such as 250° C. to 500° C. or 250° C. to 400° C., provided that $T_c$ of the reference layer is greater than $T_c$ of the memory layer by approximately 75° C. to 100° C. or more than 100° C.

The above values for $T_c$ are suggested values which may vary; the lower limit of $T_c$ probably being dictated by multilayer film carrier to noise ratio, and upper limit by available laser power and the threshold of the multilayer film to damage by the laser. The difference in $T_c$ between the layers may vary according to how the multilayers are fabricated.

Most preferably, the materials system of the present invention satisfies the following requirement as to coercivity of the memory layer at copying temperature:

$$H_c(\text{copying temperature})(\text{memory layer}) < \frac{\sigma_w(\text{copying temperature})}{2M_s(\text{copying temperature})(\text{memory layer}) h(\text{memory layer})]} - H_b$$

References hereinabove and hereinafter in this specification to coercivity refer to room temperature coercivity unless otherwise stated.

Where there is present an interlayer between the substrate and the first Pt/Co multilayer film, the average thickness of said interlayer when comprising metal may be up to 250 Å such as up to 50 Å or preferably sub-monolayer thickness to 20 Å, while when comprising a dielectric the interlayer may have a thickness up to several thousand Å.

Spacer average thickness may be up to 100 Å, and is preferably up to 25 Å. In the exchange coupled systems of the present invention, spacer thickness should be up to 50 Å, such as sub-monolayer thickness to 25 Å. Since post-deposition treatment performed on the spacers and interlayer of the present invention will have the effect of altering actual thickness, the thicknesses referred to herein represent the amount of spacer and interlayer material actually deposited ("as-deposited") before any subsequent treatment and/or the amount of spacer and interlayer material remaining after any subsequent treatment.

Preferably each individual cobalt layer in the materials system of the invention has a thickness of up to 12 Å and each individual platinum layer has a thickness of up to 25 Å. Most preferably, the thickness of each cobalt layer is 2–5 Å and each platinum layer 3–20 Å. Preferably each total multilayer film has a thickness of less than 500 Å. Preferably each multilayer film comprises up to 50 layers in total, or 25 "periods" of Pt/Co, for example 2–15 periods.

The substrate material may be any suitable material such as a suitable metal or dielectric material, or a polymer such as polycarbonate or glass. Preferably the substrate material is glass. In a commercial RE-TM MO disc it is common practice to include an "optical enhancement layer", such as silicon nitride, between the substrate and the MO material. This layer may be optimised with respect to its thermal properties. For the purposes of the invention of this application, references to a substrate are intended to include substrates on which are deposited one or more layers of materials for optical enhancement. For example therefore, the substrate material may be glass on which is deposited a dielectric material selected from the group silicon, silicon nitride, silicon dioxide aluminium nitride, zinc oxide and other such materials.

In a commercial RE-TM MO disc structure layers additional to the substrate, optical enhancement and MO multilayers are commonly included. Such additional layers may include optionally thermally optimised reflective layers, eg of aluminium. The materials system of the present invention may be used in a typical disc configuration, and the present invention therefore provides a magneto-disc comprising the materials system of the present invention.

In use, laser modulated thermo-magnetic MO data storage systems may be optically addressed by a laser in two modes, ie, through the substrate, or from the multilayer side. Conventionally in direct overwrite systems, the laser is incident on the memory layer rather than any other magnetically-active component of the system. Therefore, for through the substrate laser illumination, the memory layer should be adjacent the substrate, and for from-the-multilayer side laser illumination, the memory layer should be nearest the laser (therefore in a two-multilayer system, the reference layer would be adjacent the substrate).

The particular method of making a materials system according to the present invention depends on the nature and composition of the system and whether it is intended for use primarily in through the substrate or multilayer side laser illumination.

In general, the materials systems of the present invention may be made by a process comprising; optionally hyperthermally processing a substrate material; sputter deposition of an optional interlayer onto the substrate material and optionally hyperthermally processing or heat treating the interlayer; sputter deposition of a multilayer of Pt and Co onto the substrate or interlayer; optional heat treatment of the multilayer; sputter deposition of an optional spacer structure onto the multilayer and optional hyperthermal processing and/or heat treatment of said spacer structure and sputter deposition of a multilayer of Pt and Co onto the spacer structure or multilayer of Pt and Co and optional heat treatment of the multilayer.

For materials systems comprising more than two multilayers of Pt and Co, each additional layer may be deposited as above onto the previously deposited multilayer or spacer structure.

Therefore, the Pt/Co multilayer adjacent the substrate may be sputtered onto an optionally hyperthermally processed substrate, and is preferably deposited onto a metal or dielectric interlayer of suitable thickness which has been deposited onto an optionally hyperthermally processed substrate and treated by at least one of hyperthermal processing and heat treatment. The deposited multilayer may be subjected to heat treatment. Use and treatment of the interlayer, treatment of the multilayer and practical process parameters employed during deposition all contribute towards control of the multilayer coercivity and perpendicular magnetic anisotropy (pma). Control of the pma and coercivity of the second deposited layer, in order to produce the desired coercivity differential with the first deposited layer and/or exchange coupling, may then be achieved by control of the practical process parameters employed during deposition, and/or the use of a spacer of suitable thickness as described hereinabove.

In the deposition of a single multilayer or the first multilayer in a multilayer stack, dual growth surface hyperthermal treatments may be used in the control of MO film characteristics (as described in European patent application, publication number 0 549 246 A2). Subsequent multilayer deposition in multilayer stack systems allow careful hyperthermal treatment(s) of the spacer only, if the properties of the original multilayer(s) are to remain within acceptable limits. In the stacked multilayer case the pre-existing film acts to some degree as a structural pre-cursor or template modulating the effects of subsequent hyperthermal and/or heat processing.

The spacer may be formed in a single deposition or a series of depositions of incremental thickness, with optional hyperthermal processing and/or heat treatment at any or each stage.

Sputter deposition of the interlayer or spacer may be carried out in any noble gas or mixture of noble gases. Preferably the interlayer or spacers are sputtered in one or more of Ar, Kr and Xe. In forming of a spacer, a reactive gas/inert gas mixture may be used. The rate of sputtering may be up to several hundred Å/s of metal but is preferably up to 100 Å/s, such as 10 Å/s, or 1 Å.

The Pt/Co multilayers may be sputtered in any of the noble gases or mixture of noble gases and are preferably sputtered in one or more of At, Kr and Xe. The rate of sputtering may be typically in the range of $1-20\times10^{-9}$ m/s of metal.

Sputter deposition may be carried out via any suitable means. Many such means, such as dc or rf or microwave magnetron-, diode-, or triode-sputtering, or sputtering of targets through bombardment by energetic particles from ion or atom guns, are well known in the art.

During multilayer sputtering, the distance between the substrate and the sputter sources of the components of the multilayer may be different, and are variable according to the initial energy of particles leaving the sputtering target and the nature, pressure, composition and temperature of the sputter gas during sputtering, according to the pressure distance relationship, in order to achieve desirable low arrival energy of condensing metal particles at the substrate during film growth. Control of arrival energy is also of importance during deposition of interlayer and spacer structures.

Hyperthermal processing comprises high energy particle bombardment and is used in order to influence the surface characteristics of any or all of the substrate, interlayer, or spacers prior to deposition of the interlayer or multilayer as appropriate. In the initial stages of film growth, the nature of the growth surface exerts a critical influence on the developing film structure. The thin nature of the interlayer, spacers and Pt/Co thin film multilayer permits some degree of control of film growth through surface engineering of growth surfaces to develop aspects of film microstructure beneficial to MO properties. In the process of the present invention there is no need to heat the substrate in order to advantageously enhance MO properties. The suitably engineered growth surface is not erased by the use of low energy particles in film deposition, and therefore a growth mode providing desirable MO characteristics in the MO film is allowed to be established.

Hyperthermal processing may conveniently be provided by for example the application of an rf excitation or dc bias to the substrate table, in a low pressure atmosphere, or by placing the substrate or interlayer close to a plasma source, in a low pressure atmosphere, or by particle bombardment from particle guns such as ion or atom guns.

Where rf excitation is employed in hyperthermal processing performed on the substrate, where interlayers of as-deposited thicknesses of up to approximately 50 Å are to be applied, the applied energy density inducing high energy particle bombardment may conveniently be up to 300 $Jcm^{-2}$ with power densities conveniently up to 0.35 $Wcm^{-2}$. However, depending on the nature of the substrate greater values of energy density and power density may be used. Proper considerations of substrate induced bias, power density and energy density also apply to hyperthermal treatments of interlayer and spacers.

Each metal multilayer, or interlayer, or spacer may be heat treated after deposition. Preferably each multilayer is heat treated after deposition. Said heat treatment is advantageously carried out in the presence of oxygen, for example in air or in a mixture of gases including air and/or oxygen gas. The effect of the heat treatment is variable according to the pressure or partial pressure of oxygen. It may be reasonably expected that the use of pressures above atmosphere may be advantageous. Alternatively, it is thought that said heat treatment may be carried out in an atmosphere in which oxygen is present as a combined species.

In general the heat treatment comprises the stages of heating, settle, and cool-down although the settle stage is not essential. Heating may be up to a temperature of about 100°–400° C., such as 150°–250° C., and may be at any rate, such as around 10° C./minute to around 100° C./minute. The rate of heating is not of essential importance and in a commercial environment would be as high as possible, perhaps 10°–100° C./s. The heating may be carried out in one or more stages, with or without the reaching of a thermal steady state after each stage. Exposure to heating may be continuous or cycled, or part-continuous and part-cycled. Said heating may be provided by any suitable means—for example, heating may be carried out in a furnace, or the sample may be placed in a vessel to be heated, or heating may be provided by one or more than one continuous resistive heat source or lamp source, such as filament or discharge lamp source. Accordingly, light bulbs, such as halogen light bulbs, may be employed as the heating source in the present invention. Where light bulbs are employed, one or more may be used. In the method of the invention these are placed, with spatial separation from the multilayer film, around, eg above and below, the film. The distance between any bulb and the multilayer film varies, eg according to the wattage of the bulb, the thickness of the film, and the thermal properties of the substrate. Advantageously, the bulbs are surrounded by curved reflectors, to intensify and/or make uniform the radiation at the film samples. It is advantageous to use parabolic reflectors to achieve uniform illumination of the sample.

The second stage of the heat treatment is the optional settle stage wherein the material is maintained at a temperature for a period of time, such as up to 30 minutes or up to 5 minutes or preferably one minute or less, even as low as less than one second. Thereafter the material is cooled or allowed to cool in one or more stages and if desired at varying rates. Any practical rate of cooling may be used, such as up 10° C./minute, or preferably up to 100° C./minute. The rate of cooling is not of essential importance and in a commercial environment would be as high as possible, perhaps 10° C./s to 100° C./s. Any suitable method of cooling may be employed. If desired, said heat treatment may be carried out in a magnetic field.

The invention will now be illustrated by way of Examples which are intended to illustrate but not limit the invention.

Magneto optic measurements were performed at 670 nm using a custom-built polar Kerr loop tracer. Unless otherwise indicated, measurements were made through the multilayer side of the materials.

In all Examples the sputtering machine used was a modified Nordiko NS 3750, supplied by Nordiko Ltd of Havant, Hampshire, UK, and modified at the Johnson Matthey Technology Centre. The sputtering electrodes in all cases were dc and/or rf planar magnetrons. Unless otherwise stated, all treatments were carried out in air, at atmospheric pressure.

Example 1 demonstrates the control of Curie temperature through variation of the number of multilayer periods.

Examples 2a–2d demonstrate the control of Curie temperature through adjustment of the ratio of platinum to cobalt.

Examples 3a–3g investigate the effect of varying process parameters on Curie temperature.

Examples 4–6 demonstrate control of $H_c$ and $T_c$ in bi-multilayer structures.

Examples 7–10 demonstrate exchange coupling in bilayer structures.

EXAMPLE 1

A pre-cleaned glass substrate was mounted onto a substrate table in a vacuum chamber, and the chamber pumped to a base pressure of approximately $2-5\times10^{-6}$ mb.

Pure Ar gas was metered into a pumped chamber to attain a pressure of $1.5\times10^{-2}$ mb and the system allowed to equilibrate for several minutes. ("Gas Equilibration").

The octagonally-faced substrate table of total surface area 2960 $cm^2$ was situated 11 cm from a platinum sputter source and 11 cm from a cobalt sputter source and rotated at 6 rpm, whilst 1000 watts of constant radio frequency (rf) power at 13.56 MHz, equivalent to 0.34 $Wcm^{-2}$ was applied to the table for 7 minutes establishing the table at a negative bias of approximately 245V with respect to ground potential ("Hyperthermal Treatment S1").

With the substrate table obscured by shutters from a planar magnetron source fitted with an 8"×4" Pt target, 124

W of dc power was applied to the sputter source for several minutes, to clean the sputter target and establish a steady state of operation ("Target Pre-Conditioning Stage").

The Pt interlayer was then deposited in two sequential passes by the Pt sputter source, establishing a total thickness of 16 Å. The power supplied to the sputter electrode was 124 W, the electrode bias was −414V with respect to ground potential. The substrate was at a negative potential of 12 to 15V with respect to ground potential. The substrate to target separation was 11 cm and the table was rotated at 6 rpm ("Interlayer Deposition").

The surface of the Pt interlayer was then hyperthermally treated by applying rf power (13.56 MHz) to the substrate table. 200 W of rf power was applied for a period of 5 minutes, establishing a table bias with respect to ground of −105V the substrate table rotating at 6 rpm ("Hyperthermal Treatment S2").

The source of Co flux for the production of the desired multilayer structure was provided by a rf planar magnetron source located directly opposite but facing the Pt source. The flux from either source was obscured by the substrate table positioned between them. A thin cobalt target was used (8"×4"×1 mm) to enhance the magnetron sputtering effect. With the substrates obscured from both sputter sources, power was applied to each source at the values required for the respective deposition rates of Pt or Co respectively, for fabrication of the multilayer structure. This situation was maintained for several minutes enabling equilibration of the sputter sources at the respective power settings for the required deposition rates ("Target Pre-Conditioning Prior to Multilayer Deposition").

The shuttering obscuring the substrate table was removed such that the flux from both sources was incident at the table, and the substrates rotated past the sources producing an alternating structure of Pt and Co layers. The first and last layers being Pt, a structure of 7 layers, ie 3.5 periods of Pt and Co in total in 6.5 table rotations, was achieved. The table rotation was 6 rpm, and constant rf power applied to the cobalt sputter electrode to achieve a deposition of approximately 3 Å thick Co layer per substrate pass. Constant dc power applied to the Pt sputter electrode achieved approximately an 8 Å thick Pt layer per pass. ("Multilayer Deposition"). 124 W of dc power was applied to the Pt sputter electrode, establishing a bias of −414V on the Pt target. 400 W of rf power was used to establish a self-bias of −600V with respect to ground on the Co target. The substrate was at a negative potential of 1 to 2V with respect to ground. The gas metering and separations of the sputter electrodes with respect to the substrate table were as previously described under "Hyperthermal Treatment S1".

The glass substrate with the deposited multilayer was removed from the sputtering chamber.

Four further samples were prepared similarly, adjustment of the number of table rotations in the "Multilayer Deposition" stage giving varying numbers of periods.

The Curie temperature of each sample was measured and is tabulated in Table 1 as a function of the number of periods.

TABLE 1

| Sample No | No of Periods | $T_c$ (°C) |
| --- | --- | --- |
| 1a | 3.5 | 310 |
| 1b | 6.5 | 370 |
| 1c | 9.5 | 380 |
| 1d | 15.5 | 400 |
| 1e | 21.5 | 400 |

EXAMPLE 2a

A pre-cleaned glass substrate was mounted onto a substrate table in a vacuum chamber, and the chamber pumped to a base pressure of $2.8 \times 10^{-6}$ mb.

Pure Ar gas was metered into a pumped chamber to attain a pressure of $1.5 \times 10^{-2}$ mb and the system allowed to equilibrate for several minutes ("Gas Equilibration 1").

The octagonally-faced substrate table of total surface area 2960 cm² was situated 11 cm from a platinum sputter source and 11 cm from a cobalt sputter source and rotated at 6 rpm, whilst 710 watts of constant rf power at 13.56 MHz, equivalent to 0.24 Wcm⁻² was applied to the table for 3 minutes establishing the table at a negative bias of approximately 250V with respect to ground potential ("Hyperthermal Treatment S1").

With the substrate table obscured by shutters from a planar magnetron source fined with an 8"×4" Pt target, 120 W of dc power was applied to the sputter source for several minutes, to clean the sputter target and establish a steady state of operation ("Target Pre-Conditioning Stage").

The Pt interlayer was then deposited in two sequential passes by the Pt sputter source, establishing a total thickness of 16 Å. The power supplied to the sputter electrode was 120 W, the electrode bias was −406V with respect to ground potential. The substrate was at a negative potential of 10 to 11V with respect to ground potential. The substrate to target separation was 11 cm and the table was rotated at 6 rpm ("Interlayer Deposition").

The surface of the Pt interlayer was then hyperthermally treated by applying rf power (13.56 MHz) to the substrate table. 150 W of rf power was applied for a period of 5 minutes, establishing a table bias with respect to ground of −100V, the substrate table rotating at 6 rpm ("Hyperthermal Treatment S2").

The argon gas pressure was then adjusted to $3.0 \times 10^{-2}$ mb. ("Gas Equilibration 2").

The source of Co flux for the production of the desired multilayer structure was provided by a rf planar magnetron source located directly opposite but facing the Pt source. The flux from either source was obscured by the substrate table positioned between them. A thin cobalt target was used (8"×4"×1 mm) to enhance the magnetron sputtering effect. With the substrates obscured from both sputter sources, power was applied to each source at the values required for the respective deposition rates of Pt or Co respectively, for fabrication of the multilayer structure. This situation was maintained for several minutes enabling equilibration of the sputter sources at the respective power settings for the required deposition rates ("Target Pre-Conditioning Prior to Multilayer Deposition").

The shutters obscuring the substrate table were removed such that the flux from both sources was incident at the table, and the substrates rotated past the sources producing an alternating structure of Pt and Co layers. The first and last layers being Pt, a structure of 25 layers in total in 12.5 table rotations, was achieved. The table rotation was 6 rpm, and constant rf power applied to the cobalt sputter electrode to achieve a deposition of approximately 3 Å thick Co layer per substrate pass. Constant dc power applied to the Pt sputter electrode achieved approximately a 6 Å thick Pt layer per pass. ("Multilayer Deposition"). 90 W of dc power was applied to the Pt sputter electrode, establishing a bias of −370V on the Pt target. 400 W of rf power was used to establish a self-bias of −520V with respect to ground on the Co target. The substrate was at a negative potential of 2 to 3V with respect to ground.

The glass substrate with the deposited multilayer was removed from the sputtering chamber.

The Curie temperature of the multilayer was measured.

EXAMPLE 2b

The procedure of Example 2a was followed with the following notable adjustments:

In the "Multilayer Deposition" stage 150 W of dc power was applied to the dc electrode establishing a bias of −397V on the Pt sputtering target, corresponding to deposition of approximately 9.5 Å Pt per pass. The first and last layers being Pt a Pt/Co structure of 17 layers in total was achieved in 8.5 table rotations. The substrate was at a negative potential of 3–5V with regard to ground during the multilayer deposition.

EXAMPLE 2c

The procedure of Example 2a was followed with the following notable adjustments:

The "Hyperthermal Treatment S1" stage was applied for 7 minutes.

After "Hyperthermal Treatment S2", the argon gas pressure was adjusted to $2.5 \times 10^{-2}$ mb. ("Gas Equilibration S").

In the "Multilayer Deposition" stage 185 W of dc power was applied to the dc electrode establishing a bias of −415V on the Pt sputtering target, corresponding to deposition of approximately 11 Å per pass. The first layers and last layers being Pt and Pt/Co multilayer structure of 15 layers in total was achieved in 7.5 table rotations. The substrate was at a negative potential of 2–5V with respect to ground during the multilayer deposition.

EXAMPLE 2d

The procedure of Example 2c was followed with the following notable adjustments:

In the "Hyperthermal Treatment S1 stage" 1000 W of rf power was applied establishing a negative bias of approximately 245V with respect to ground potential.

In the "Multilayer Deposition" stage 215 W of dc power was applied to the dc electrode establishing a bias of −428V on the Pt sputtering target, corresponding to deposition of approximately 15 Å per pass. The first layers and last layers being Pt a Pt/Co multilayer structure of 19 layers in total was achieved in 9.5 table rotations. The substrate was at a negative potential of 2–3V with respect to ground during the multilayer deposition.

Table 2 tabulates Curie temperature of the multilayers of Examples 2a–2d against ratio of Pt to Co.

TABLE 2

| Example | Number of Periods | Pt/Co Thickness Ratio (Å/Å) | Curie Temperature (°C.) |
|---|---|---|---|
| 2a | 12.5 | 3/6 | 470 |
| 3d | 9.5 | 3/8 | 380 |
| 2b | 8.5 | 3/9.5 | 300 |
| 2c | 7.5 | 3/11 | 280 |
| 2d | 9.5 | 3/15 | 180 |

EXAMPLE 3a: Variation of Hyperthermal Processing Stages

A pre-cleaned glass substrate was mounted onto a substrate table in a vacuum chamber, and the chamber pumped to a base pressure of $2 \times 10^{-6}$ mb.

Pure Ar gas was metered into a pumped chamber to attain a pressure of $1.5 \times 10^{-2}$ mb and the system allowed to equilibrate for several minutes. ("Gas Equilibration 1").

The octagonally-faced substrate table of total surface area 2960 cm² was situated 11 cm from a platinum sputter source and 11 cm from a cobalt sputter source and rotated at 6 rpm, whilst 700 watts of constant rf power at 13.56 MHz, equivalent to 0.24 Wcm⁻² was applied to the table for 20 minutes establishing the table at a negative bias of approximately 200V with respect to ground potential ("Hyperthermal Treatment S1").

With the substrate table obscured by shutters from a planar magnetron source fitted with an 8"×4" Pt target, 124 W of dc power was applied to the sputter source for several minutes, to clean the sputter target and establish a steady state of operation ("Target Pre-Conditioning Stage").

The Pt interlayer was then deposited in six sequential passes by the Pt sputter source, establishing a total thickness of approximately 50 Å. The power supplied to the sputter electrode was 124 W, the electrode bias was −414V with respect to ground potential. The substrate was at a negative potential of approximately 15V with respect to ground potential. The substrate to target separation was 11 cm and the table was rotated at 6 rpm ("Interlayer Deposition").

The surface of the Pt interlayer was then hyperthermally treated by applying rf power (13.56 MHz) to the substrate table. 200 W of rf power was applied for a period of 5 minutes, establishing a table bias with respect to ground of −100V, the substrate table rotating at 6 rpm ("Hyperthermal Treatment S2").

The source of Co flux for the production of the desired multilayer structure was provided by a rf planar magnetron source located directly opposite but facing the Pt source. The flux from either source was obscured by the substrate table positioned between them. A thin cobalt target was used (8"×4×1 mm) to enhance the magnetron sputtering effect. With the substrates obscured from both sputter sources, power was applied to each source at the values required for the respective deposition rates of Pt or Co respectively, for fabrication of the multilayer structure. This situation was maintained for several minutes enabling equilibration of the sputter sources at the respective power settings for the required deposition rates ("Target Pre-Conditioning Prior to Multilayer Deposition").

The shuttering obscuring the substrate table was removed such that the flux from both sources was incident at the table, and the substrates rotated past the sources producing an alternating structure of Pt and Co layers. The first and last layers being Pt, a structure of 19 layers in total in 9.5 table rotations, was achieved. The table rotation was 6 rpm, and constant rf power applied to the cobalt sputter electrode to achieve a deposition of approximately 3 Å thick Co layer per substrate pass. Constant dc power applied to the Pt sputter electrode achieved approximately an 8 Å thick Pt layer per pass. ("Multilayer Deposition"). 124 W of dc power was applied to the Pt sputter electrode, establishing a bias of −414V on the Pt target. 400 W of rf power was used to establish a self-bias of −600V with respect to ground on the Co target. The substrate was at a negative potential of 2 to 3V with respect to ground. The gas metering and separations of the sputter electrodes with respect to the substrate table were as previously described under "Hyperthermal Treatment S1".

The glass substrate with the deposited multilayer was removed from the sputtering chamber.

EXAMPLE 3b: Variation of Hyperthermal Processing

A pre-cleaned glass substrate was mounted onto a substrate table in a vacuum chamber, and the chamber pumped to a base pressure of approximately $2 \times 10^{-6}$ mb.

Pure Ar gas was metered into a pumped chamber to attain a pressure of $1.5 \times 10^{-2}$ mb and the system allowed to equilibrate for several minutes. ("Gas Equilibration 1").

The octagonally-faced substrate table of total surface area 2960 cm² was situated 11 cm from a platinum sputter source and 11 cm from a cobalt sputter source and rotated at 6 rpm, whilst 1000 watts of constant rf power at 13.56 MHz, equivalent to 0.34 Wcm⁻² was applied to the table for 7 minutes establishing the table at a negative bias of approximately 240V with respect to ground potential ("Hyperthermal Treatment S1").

With the substrate table obscured by shutters from a planar magnetron source fitted with an 8"×4" Pt target. 124 W of dc power was applied to the sputter source for several minutes, to clean the sputter target and establish a steady state of operation ("Target Pre-Conditioning Stage").

The Pt interlayer was then deposited in two sequential passes by the Pt sputter source, establishing a total thickness of approximately $16 \times 10^{-9}$ m. The power supplied to the sputter electrode was 124 W, the electrode bias was −414V with respect to ground potential. The substrate was at a negative potential of approximately 15V with respect to ground potential. The substrate to target separation was 11 cm and the table was rotated at 6 rpm ("Interlayer Deposition").

The surface of the Pt interlayer was then hyperthermally treated by applying rf power (13.56 MHz) to the substrate table. 100 W of rf power was applied for a period of 10 minutes, establishing a table bias with respect to ground of −70V, the substrate table rotating at 6 rpm ("Hyperthermal Treatment S2").

The source of Co flux for the production of the desired multilayer structure was provided by a rf planar magnetron source located directly opposite but facing the Pt source. The flux from either source was obscured by the substrate table positioned between them. A thin cobalt target was used (8"×4"×1 mm) to enhance the magnetron sputtering effect. With the substrates obscured from both sputter sources, power was applied to each source at the values required for the respective deposition rates of Pt or Co respectively, for fabrication of the multilayer structure. This situation was maintained for several minutes enabling equilibration of the sputter sources at the respective power settings for the required deposition rates ("Target Pre-Conditioning Prior to Multilayer Deposition").

The shuttering obscuring the substrate table was removed such that the flux from both sources was incident at the table, and the substrates rotated past the sources producing an alternating structure of Pt and Co layers. The first and last layers being Pt, a structure of 19 layers in total in 9.5 table rotations, was achieved. The table rotation was 6 rpm, and constant rf power applied to the cobalt sputter electrode to achieve a deposition of approximately 3 Å thick Co layer per substrate pass. Constant dc power applied to the Pt sputter electrode achieved approximately an 8 Å thick Pt layer per pass. ("Multilayer Deposition"). 124 W of dc power was applied to the Pt sputter electrode, establishing a bias of −414V on the Pt target 400 W of rf power was used to establish a self-bias of −600V with respect to ground on the Co target. The substrate was at a negative potential of 1 to 2V with respect to ground. The gas metering and separations of the sputter electrodes with respect to the substrate table were as previously described under "Hyperthermal Treatment S1".

The glass substrate with the deposited multilayer was removed from the sputtering chamber.

EXAMPLE 3c: Variation of Multilayer Coercivity

The procedure of Example 3a was followed with the following notable exceptions:

1. During the "Hyperthermal Treatment S1) stage 1000 W of rf power was applied for 7 minutes establishing a negative bias of approximately 245V with regard to ground potential;

During the "Interlayer Deposition" stage a Pt layer approximately 16 Å thick was deposited in two sequential passes by the sputter electrode.

EXAMPLE 3d: Variation of Multilayer Coercivity

The fabrication procedure of Example 3c was followed with the following notable exceptions:

After the "Hyperthermal Treatment S2"stage the argon gas pressure was then adjusted to $2.5 \times 10^{-2}$ mb and allowed to equilibrate.

During the "Multilayer Deposition" stage 120 W of dc power was applied to the Pt sputter electrode, establishing a bias of −391V on the Pt target 400 W of rf power was used to establish a self-bias of −520V with respect to ground on the Co target The substrate was at a negative potential of 3 to 4V with respect to ground.

EXAMPLE 3e: Enhanced Coercivity Through Heat Treatment

The sample was prepared as in Example 3d and then subjected to the following heat treatment:

The sample was placed on a hot plate at 175° C. for 10 minutes. The sample was then removed and placed on a steel block at room temperature and allowed to cool to room temperature.

EXAMPLE 3f: Enhanced Coercivity Through Heat Treatment

The sample was prepared as in Example 3d and then subjected to the following heat treatment:

The sample was placed on a hot plate at 175° C. for 20 minutes. The sample was then removed and placed on a steel block at room temperature and allowed to cool to room temperature.

EXAMPLE 3g: Enhanced Coercivity Through Heat Treatment

The sample was prepared as in Example 3d and then subjected to the following heat treatment:

The sample was placed on a copper block at 170° C. for 70 minutes, the sample was then removed and placed on a steel block at room temperature and allowed to cool to room temperature. This was repeated a further three times with the following differences:

First repeat 190 minutes at 170° C.

Second repeat 340 minutes at 170° C.

Third repeat 210 minutes at 234° C.

$H_c$ and $T_c$ for Examples 3a–3g were measured and are tabulated in Table 3 below.

TABLE 3

| EXAMPLE | ROOM TEMPERATURE COERCIVITY (kOe) | CURIE TEMPERATURE (°C.) |
| --- | --- | --- |
| 3a | 1.40 | 390 |
| 3b | 1.01 | 390 |
| 3c | 2.30 | 380 |
| 3d | 4.30 | 380 |

TABLE 3-continued

| EXAMPLE | ROOM TEMPERATURE COERCIVITY (kOe) | CURIE TEMPERATURE (°C.) |
|---|---|---|
| 3e | 6.06 | 370 |
| 3f | 7.68 | 370 |
| 3g | 9.50 | 370 |

EXAMPLE 4

First Layer

1. A pre-cleaned glass microscope slide was mounted onto a substrate table in the vacuum chamber, and the chamber pumped to a base pressure of $1.3 \times 10^{-6}$ mb;

2. Pure argon was metered into the pumped chamber, to attain a pressure of $1.5 \times 10^{-2}$ mb and the system allowed to equilibrate for several minutes. ("Gas Equilibration");

3. The substrate table of area 2960 cm$^2$ was positioned 11 cm from each of two opposed sputter sources and rotated at 6 rpm whilst 1000 watts of constant rf power at 13.56 MHz applied to the table, equivalent to 0.34 Wcm$^{-2}$; established the table at a negative bias of 250V with respect to ground potential. The power was applied for 7 minutes duration. ("Hyperthermal Treatment S1");

4. With the substrate table obscured by shutters from a planar magnetron source fitted with an 8"×4" Pt target, 120 W of dc power was applied to the sputter source for several minutes to clean the sputtering target and establish a steady state of operation. No changes were made to the gas pressures or metering. ("Target Pre-conditioning Stage").

5. A Pt interlayer was then deposited by two sequential passes by the Pt sputter source, establishing a total thickness of approximately 16 Å. The power supplied to the sputter electrode was 120 W, electrode bias −408V with respect to ground potential, the substrate to target separation 11 cm and the table rotated at 6 rpm, possessing an induced bias of approximately −15V with respect to ground potential. ("Pt Interlayer Deposition").

6. The surface of the Pt interlayer was then hyperthermally treated by applying rf power (13.56 MHz) to the substrate table. 200 W of rf power was applied, establishing a table bias with respect to ground of −110 to −105V the substrate table rotating at 6 rpm, for a period of 5 minutes. ("Hyperthermal Treatment S2").

The argon gas pressure was then adjusted to $2.5 \times 10^{-3}$ mb and time allowed for equilibration.

7. A rf planar magnetron source located directly opposite but facing the Pt source provided the source of Co flux for production of the desired multilayer structure, the flux from either source obscured by the substrate table which was positioned centrally between them. A thin cobalt target was used (8"×4"×1 mm) to enhance the magnetron sputtering effect. With the substrate obscured from both sputter sources, power was applied to each source at the values required for the respective deposition rates of Pt and Co respectively, for fabrication of the multilayer structure. The Pt power was established first, then the Co power. This was maintained for several minutes enabling equilibration of the sputter sources at the respective power settings for the required deposition rates. ("Target Pre-Conditioning Prior to Multilayer Deposition").

8. The shuttering obscuring the substrate table was moved such that the flux from both sources was incident at the table. The substrates were rotated past the sources producing an alternating structure of Pt and Co layers. The first and last layers being Pt, a structure of 15 layers in total was achieved in 7.5 table rotations. The table rotation was 6 rpm, with constant rf power applied to the Co electrode to achieve a deposition of a 3 Å Co layer per substrate pass. Constant dc power was applied to the Pt sputter electrode to achieve a 15 Å thick Pt layer per pass.

400 W of rf power was used to establish a self-bias of −580V with respect to ground potential over the Co target. 215 W of dc power was applied to the Pt sputter electrode, establishing a bias of −422V over the Pt target, and an induced bias of minus 102V on the substrate table with respect to ground potential. The gas metering and substrate-electrode separation was as described hereinabove. ("Multilayer Deposition"). 9. A glass slide with the deposited multilayer was removed from the sputtering chamber. The sample was subjected to a heat treatment as follows:

The sample was placed in a furnace at 153° C. for 40 minutes. It was them removed and placed on an aluminium block and allowed to cool to room temperature.

Second Layer

1. The sample was mounted onto a substrate table in the vacuum chamber, and the chamber pumped to a base pressure of $2 \times 10^{-6}$ mb.

2. Pure argon gas was metered into the pumped chamber to attain a pressure of $1.5 \times 10^{-2}$ mb and the system allowed to equilibrate for several minutes. ("Gas Equilibration").

3. The substrate table, of area 2960 cm$^2$ was positioned 11 cm from each of two opposed sources and rotated at 6 rpm.

4. With the substrate table obscured by shutters from a planar magnetron source fitted with an 8"×4" Pt target, 120 W of dc power was applied to the sputter source for several minutes to clean the sputtering target and establish a steady state of operation. No changes were made to the gas pressures or metering. ("Target Pre-Conditioning Stage").

5. In addition to the last deposited Pt layer of the multilayer previously deposited and the subsequent heat treatment, the spacer fabrication continued with the deposition of approximately 50 Å of Pt through six sequential passes by the Pt sputter source. The power supplied to the sputter electrode was 120 W, the electrode bias −409V with respect to ground potential, establishing a bias of −15V with respect to ground potential on the substrate table, the substrate to target separation 11 cm and the table rotated at 6 rpm. ("Pt Interlayer Deposition").

6. The surface of the Pt spacer was then hyperthermally treated by applying rf power (13.56 MHz) to the substrate table. 200 W of rf power was applied, establishing a table bias with respect to ground of minus 105–110V, the substrate table rotating at 6 rpm, for a period of 5 minutes. ("Hyperthermal Treatment S2").

7. A rf planar magnetron source located directly opposite but facing the Pt source provided the source of Co flux for production of the desired multilayer structure, the flux from either source obscured by the substrate table, positioned centrally between them. A thin cobalt target was used (8"×4"×1 mm) to enhance the magnetron sputtering effect. With the substrates obscured from both sputter sources, power was applied to each to each source at the values required for the respective deposition rates of Pt or Co respectively, for fabrication of the multilayer structure the platinum power level established first. This situation was maintained for several minutes enabling equilibration of the sputter sources at the respective power settings for the required deposition rates. ("Target Pre-Conditioning Prior to Multilayer Deposition").

8. The shuttering obscuring the substrate table was moved such that the flux from both sources were incident at the table. The substrates were rotated past the sources producing an alternating structure of Pt and Co layers. The first and last layers being Pt, and structure of 7 layers in total achieved in 3.5 table rotations. Note deposition of the first Pt layer herein completes the fabrication of the spacer structure. The table rotation was 6 rpm, constant rf power being applied to the Co-electrode to achieve a deposition of a 3 Å Co-layer per substrate pass. Constant dc power was applied to the Pt sputter electrode to achieve an 8 Å thick Pt layer per pass.

400 W of rf power was used, established self-bias of −530V with respect to ground potential over the Co target. 120 W of dc power was applied to the Pt sputter electrode, establishing a bias of −400V over the Pt target and an induced bias of minus 1–2V with respect to ground potential on the substrate table. The gas metering and substrate-electrode separation was as previously described. ("Multilayer Deposition").

Figure 1:
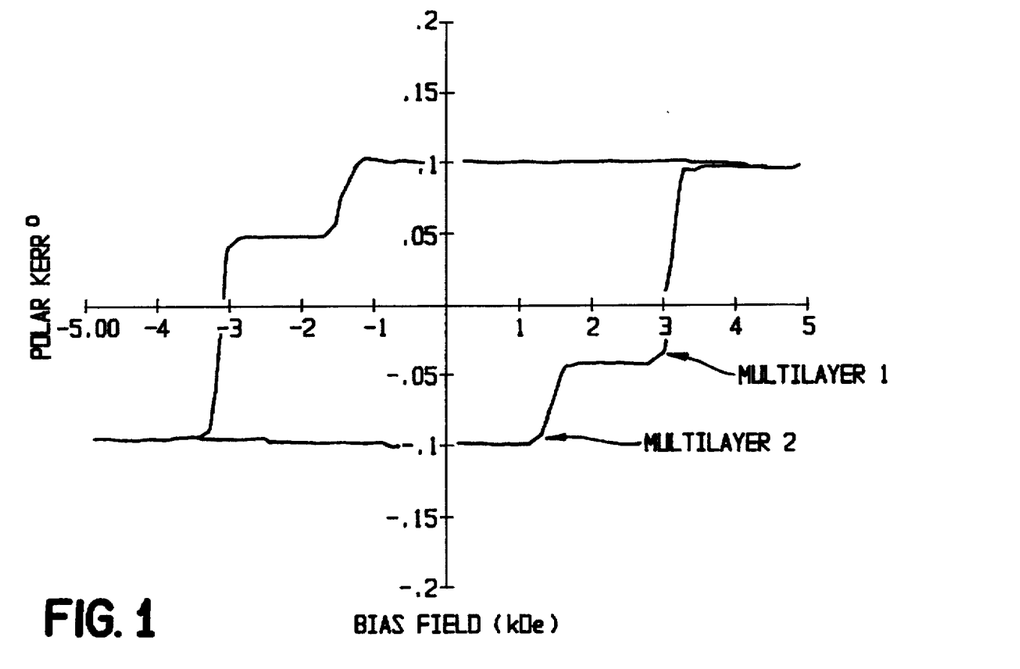

FIG. 1 shows the polar Kerr loop for from the film side optical interrogation for the bilayer multilayer structure.

EXAMPLE 5

The fabrication sequence described in Example 4 was followed with the exceptions of omission of the heat treatment stage to the first deposited multilayer; deposition of the bilayer being accomplished in a continuous, uninterrupted deposition sequence; and use of a glass substrate supplied by Pilkington PLC.

Figure 2:
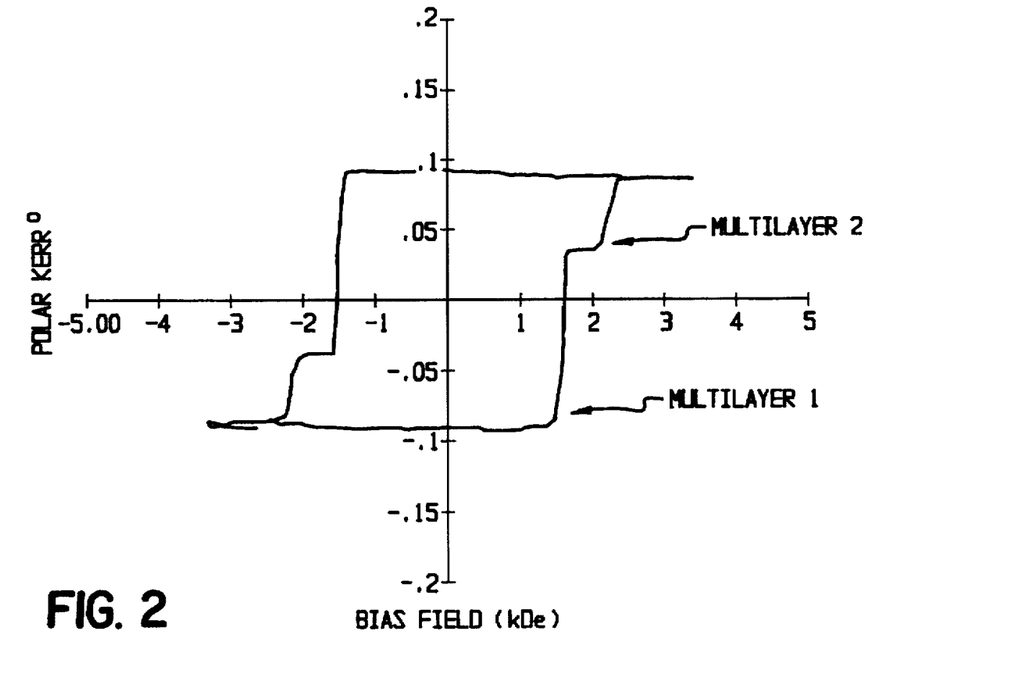

FIG. 2 shows the polar Kerr loop for this Example.

EXAMPLE 6

First Multilayer

Deposition of the first multilayer was achieved in the same way as in Example 5, but after deposition of the first multilayer, the Ar gas pressure was adjusted to $1.5 \times 10^2$ mb and allowed to equilibrate.

Second Layer

1. The substrate table, of area 2960 cm$^2$, was positioned 11 cm from each of two opposed magnetron sputter sources.

2. With the substrate table obscured by shutters from a planar magnetron source fitted with an 8"×4" Pt target, 120 W of dc power was applied to the sputter source for several minutes to clean the sputtering target and establish a steady state of operation. No changes were made to the gas pressures or metering. ("Target Pre-Conditioning Stage").

3. Deposition of the Pt spacer was then continued through three sequential passes by the Pt sputter source, depositing a thickness of approximately 25 Å. The power supplied to the sputter electrode was 120 W, the electrode bias −405V with respect to ground potential, the substrate table at negative 12–15V with respect to ground, the substrate to target separation 11 cm, and the table rotated at 6 rpm. ("Pt Interlayer Deposition").

4. The surface of the Pt spacer was then hyperthermally treated by applying rf power (13.56 MHz) to the substrate table. 200 W of rf power was applied, establishing a table bias with respect to ground of minus 110–105V the substrate rotating at 6 rpm, for a period of 5 minutes. ("Hyperthermal Treatment S2").

The argon gas pressure was then adjusted to $2.5 \times 10^{-2}$ mb and allowed to equilibrate.

5. A rf planar magnetron source located directly opposite but facing the Pt source provided the source of Co flux for production of the desired multilayer structure, the flux from either source obscured by the substrate table, positioned centrally between them. A thin cobalt target was used (8"×4"×1 mm) to enhance the magnetron sputtering effect.

With the substrates obscured from both sputter sources, power was applied to each source at the values required for the respective deposition rates of Pt or Co respectively, for fabrication of the multilayer structure the platinum power level established first. This situation was maintained for several minutes enabling equilibration of the sputter sources at the respective power settings for the required deposition rates. ("Target Pre-Conditioning Prior to Multilayer Deposition").

6. The shuttering obscuring the substrate table was moved such that the flux from both sources were incident at the table. The substrates were rotated past the sources producing an alternating structure of Pt and Co layers. The first and last layers being Pt, a structure of 13 layers in total being achieved in 6.5 table rotations. Note deposition of the first Pt layer herein completes the spacer structure. The table rotation was 6 rpm, constant rf power being applied to the Co-electrode to achieve a deposition of a 3 Å Co-layer per substrate pass. Constant dc power was applied to the Pt sputter electrode to achieve an 8 Å thick Pt layer per pass.

400 W of rf power was used, established self-bias of −580V with respect to ground potential over the Co target 120 W of dc power was applied to the Pt sputter electrode, establishing a bias of −384V over the Pt target and an induced bias of minus 1–2V with respect to ground potential on the substrate table. The gas metering and substrate-electrode separation was as previously described. ("Multilayer Deposition").

Figure 3A:
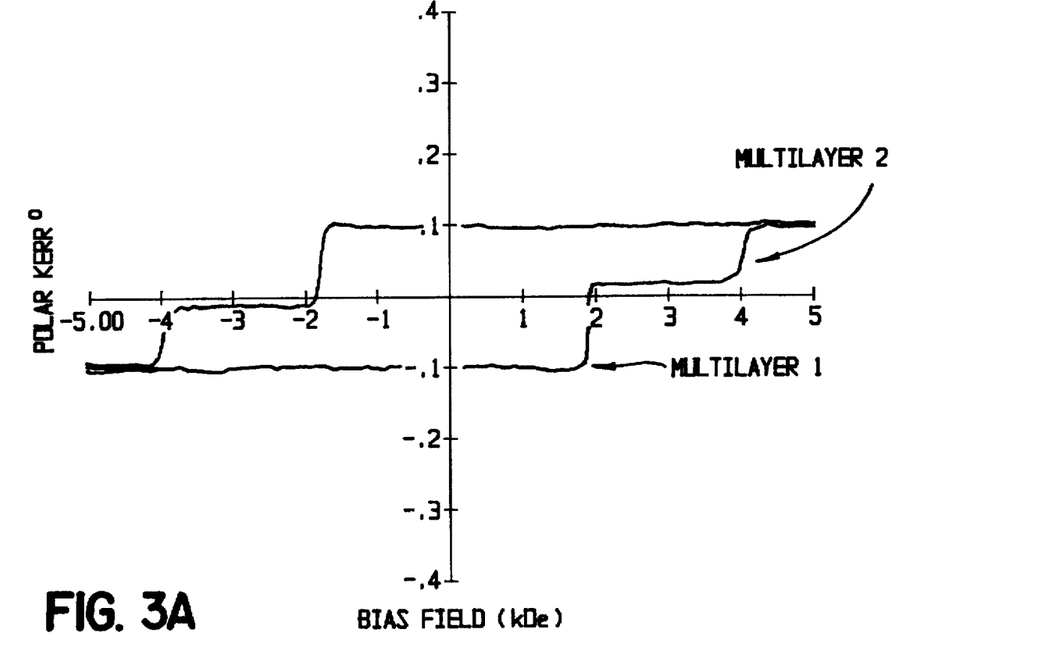
Figure 3B:
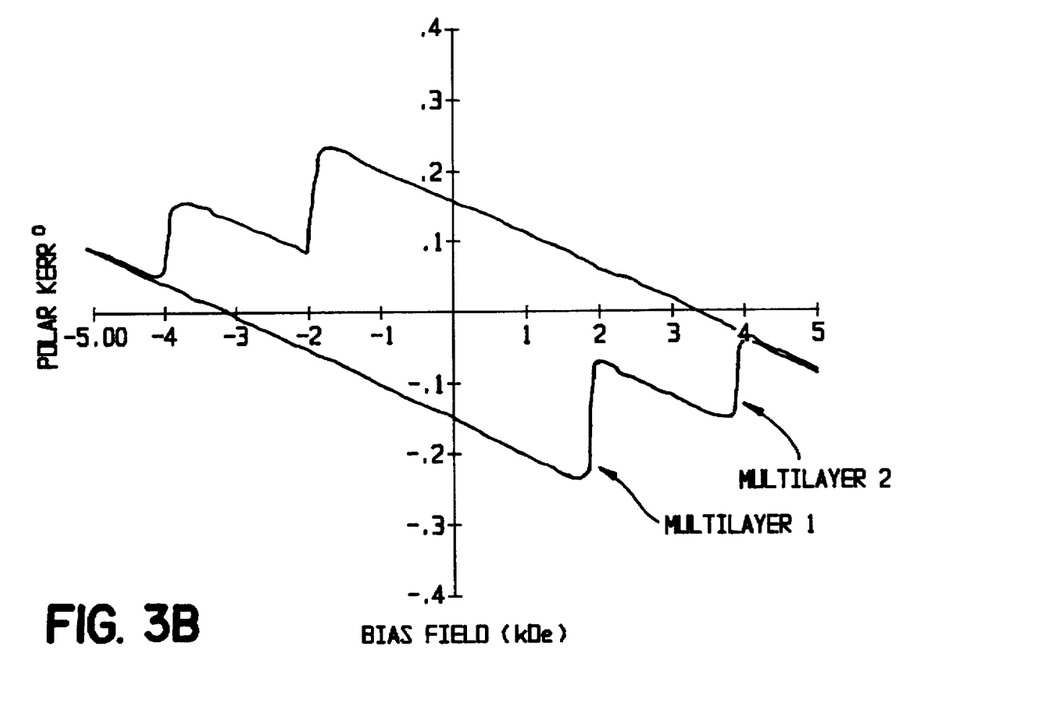

Polar Ken loops for film side and through the substrate optical interrogation are shown in FIGS. 3a and 3b.

EXAMPLE 7

First Layer

1. A pre-cleaned glass microscope slide was mounted onto a substrate table in the vacuum chamber, and the chamber pumped to a base-pressure of approximately $3 \times 10^{-6}$ mb.

2. Pure argon was metered into the pumped chamber, to attain a pressure of $1.5 \times 10^{-2}$ mb and the system allowed to equilibrate for several minutes. ("Gas Equilibration").

3. The substrate table of area 2960 cm$^2$ was positioned 11 cm from each of two opposed sputter sources and rotated at 6 rpm whilst 1000 W of constant rf power at 13.56 MHz was applied to the table, equivalent to 0.34 Wcm$^{-2}$, established the table at a negative bias of 255–240V with respect to ground potential. The power was applied for 7 minutes duration. ("Hyperthermal Treatment S1").

4. With the substrate table obscured by shutters from a planar magnetron source fitted with an 8"×4" Pt target, 120 W of dc power was applied to the sputter source for several minutes to clean the sputtering target and establish a steady state of operation. No changes were made to the gas pressures or metering. ("Target Pre-Conditioning Stage").

5. A Pt interlayer was then deposited by two sequential passes by the Pt sputter source, establishing a total thickness of approximately 16 Å. The power supplied to the sputter electrode was 120 W, electrode bias −408V with respect to ground potential, the substrate to target separation 11 cm and the table rotated at 6 rpm, possessing an induced bias of approximately −15V with respect to ground potential. ("Pt Interlayer Deposition").

6. The surface of the Pt interlayer was then hyperthermally treated by applying rf power (13.56 MHz) to the substrate table. 200 W of rf power was applied, establishing a table bias with respect to ground of approximately −110V, the substrate table rotating at 6 rpm, for a period of 5 minutes. ("Hyperthermal Treatment S2").

The argon gas pressure was then adjusted to $2.5 \times 10^{-2}$ mb and allowed to equilibrate.

7. A rf planar magnetron source located directly opposite but facing the Pt source provided the source of Co flux for production of the desired multilayer structure, the flux from either source obscured by the substrate table which was positioned centrally between them. A thin cobalt target was used (8"×4"×1 mm) to enhance the magnetron sputtering effect. With the substrate obscured from both sputter sources, power was applied to each source at the values required for the respective deposition rates of Pt and Co respectively, for fabrication of the multilayer structure. The Pt power was established first, then the Co power. This was maintained for several minutes enabling equilibration of the sputter sources at the respective power settings for the required deposition rates. ("Target Pre-Conditioning Prior to Multilayer Deposition").

8. The shuttering obscuring the substrate table was moved such that the flux from both sources was incident at the table. The substrates were rotated past the sources producing an alternating structure of Pt and Co layers. The first and last layers being Pt, a structure of 19 layers in total was achieved in 9.5 table rotations. The table rotation was 6 rpm, with constant rf power applied to the Co-electrode to achieve a deposition of a 3 Å Co-layer per substrate pass. Constant dc power was applied to the Pt sputter electrode to achieve a 8 Å thick Pt layer per pass.

400 W of rf power was used to establish a self-bias of −540V with respect to ground potential over the Co target. 120 W of dc power was applied to the Pt sputter electrode, establishing a bias of −386V over the Pt target, and an induced bias of minus 2V on the substrate table with respect to ground potential. The gas metering and substrate-electrode separation was as described hereinabove. ("Multilayer Deposition").

9. The glass slide with the deposited multilayer was removed from the sputtering chamber and subjected to a heat treatment as follows:

The sample was placed on a copper block at 170° C. for 10 minutes. It was then removed and placed on a steel block at room temperature and allowed to cool to room temperature.

Second Layer

1. The sample was mounted onto a substrate table in the vacuum chamber, and the chamber pumped to a base-pressure of $3 \times 10^{-6}$ mb.

2. Pure argon was metered into the pumped chamber, to attain a pressure of $1.5 \times 10^{-2}$ mb and the system allowed to equilibrate for several minutes. ("Gas Equilibration").

3. The substrate table of area 2960 cm$^2$ was positioned 11 cm from each of two opposed sputter sources.

4. With the substrate table obscured by shutters from a planar magnetron source fitted with an 8"×4" Pt target, 120 W of dc power was applied to the sputter source for several minutes to clean the sputtering target and establish a steady state of operation. No changes were made to the gas pressures or metering. ("Target Pre-Conditioning Stage").

5. A Pt interlayer (forming part of the spacer structure) was then deposited by one pass by the Pt sputter source, establishing a total thickness of approximately 8 Å. The power supplied to the sputter electrode was 120 W, electrode bias −405V with respect to ground potential, the substrate to target separation 11 cm, and the table rotated at 6 rpm. A negative bias of approximately 10V with respect to ground potential was established on the substrate table during deposition. ("Pt Interlayer Deposition").

6. The surface of the Pt spacer was then hyperthermally treated by applying rf power (13.56 MHz) to the substrate table. 140 W of rf power was applied, establishing a table bias with respect to ground of approximately minus 100–105V the substrate table rotating at 6 rpm, for a period of 5 minutes. ("Hyperthermal Treatment S2").

A further 4 Å of Pt spacer was then deposited in the manner described in steps 4 and 5 with the exception that the substrate table was rotated at 12 rpm, completing the spacer structure.

7. A rf planar magnetron source located directly opposite but facing the Pt source provided the source of Co flux for production of the desired multilayer structure, the flux from either source obscured by the substrate table which was positioned centrally between them. A thin cobalt target was used (8"×4"×1 mm) to enhance the magnetron sputtering effect. With the substrate obscured from both sputter sources, power was applied to each source at the values required for the respective deposition rates of Pt and Co respectively, for fabrication of the multilayer structure, the platinum power level was established first. This situation was maintained for several minutes enabling equilibration of the sputter sources at the respective power settings for the required deposition rates. ("Target Pre-Conditioning Prior to Multilayer Deposition").

8. The shuttering obscuring the substrate table was moved such that the flux from both sources was incident at the table. The substrates were rotated past the sources producing an alternating structure of Pt and Co layers. The first layer being Co and last layer being Pt, a structure of 10 layers in total was achieved in 5 table rotations. The table rotation was 6 rpm, with constant rf power applied to the Co-electrode to achieve a deposition of a 3 Å Co-layer per substrate pass. Constant dc power was applied to the Pt sputter electrode to achieve a 8 Å thick Pt layer per pass.

Figure 4:
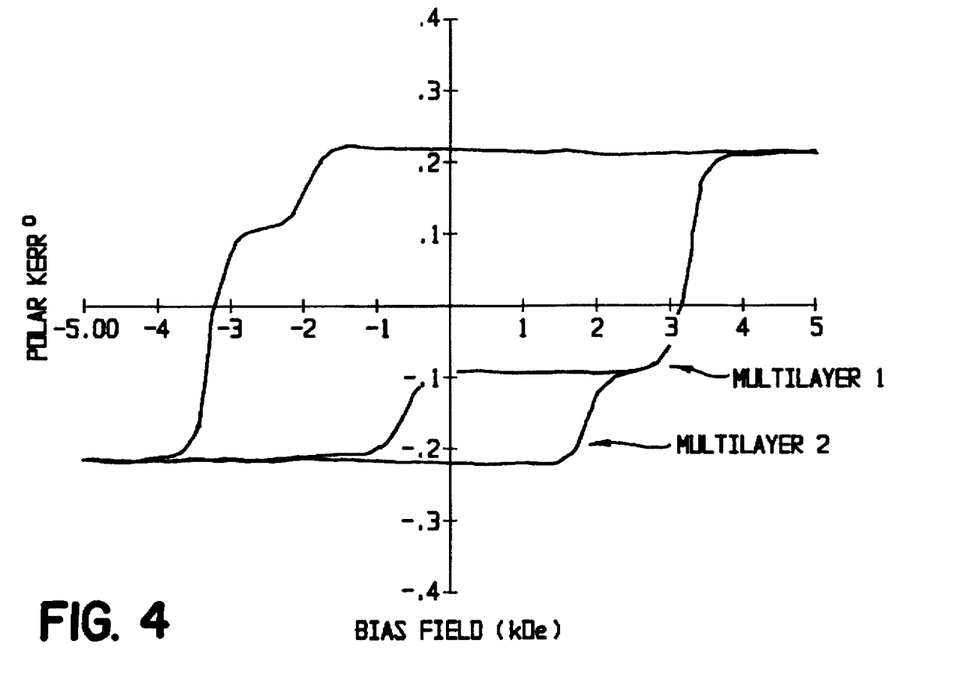

400 W of rf power was used to establish a self-bias of −510V with respect to ground potential over the Co target 120 W of dc power was applied to the Pt sputter electrode, establishing a bias of −405V over the Pt target, and an induced bias of minus 2–5V on the substrate table with respect to ground potential. The gas metering and substrate-electrode separation was as described hereinabove. ("Multilayer Deposition"). FIG. 4 shows the major and minor room temperature polar Kerr loops for this Example. Table 4 shows the coercivity shift of the minor loop (due to exchange coupling) as a function of temperature.

EXAMPLE 8

First Layer

The procedure for fabrication of the first layer was as described for that of the first layer in Example 7.

The glass slide with the deposited multilayer was removed from the sputtering chamber and subjected to a heat treatment as follows:

The sample was placed on a hot plate at 170° C. for 73 minutes. The sample was them removed and placed on a steel block at room temperature and allowed to cool to room temperature.

Second Layer

1. The sample was mounted onto a substrate table in the vacuum chamber, and the chamber pumped to a base pressure of $1.8 \times 10^{-6}$ mb.

2. Pure argon was metered into the pumped chamber, to attain a pressure of $1.5 \times 10^{-2}$ mb and the system allowed to equilibrate for several minutes. ("Gas Equilibration").

3. The substrate table of a 2960 cm$^{-2}$ was positioned 11 cm from each of two opposed sputter sources.

4. With the substrate table obscured by shutters from a planar magnetron source fitted with an 8"×4" Pt target, 120 W of dc power was applied to the sputter source for several minutes to clean the sputtering target and establish a steady state of operation. No changes were made to the gas pressures or metering. ("Target Pre-Conditioning Stage").

5. Fabrication of the Pt spacer was then continued by one pass by the Pt sputter source, depositing approximately 8 Å. The power supplied to the sputter electrode was 120 W, electrode bias −405V with respect to ground potential, the substrate to target separation 11 cm, and the table rotated at 6 rpm. A negative bias of approximately 10V with respect to ground potential was established on the substrate table during deposition. ("Pt Interlayer Deposition").

6. The surface of the Pt spacer was then hyperthermally treated by applying rf power (13.56 MHz) to the substrate table. 150 W of rf power was applied, establishing a table bias with respect to ground of approximately minus 105–110V, the substrate table rotating at 6 rpm, for a period of 5 minutes. ("Hyperthermal Treatment S2").

7. A rf planar magnetron source located directly opposite but facing the Pt source provided the source of Co flux for production of the desired multilayer structure, the flux from wither source obscured by the substrate table which was positioned centrally between them. A thin cobalt target was used (8"×4"×1 mm) to enhance the magnetron sputtering effect. With the substrate obscured from both sputter sources, power was supplied to each source at the values required for the respective deposition rates of Pt and Co respectively, for fabrication of the multilayer structure, the platinum power level was established first. This situation was maintained for several minutes enabling equilibration of the sputter sources at the respective power settings for the required deposition rates. ("Target Pre-Conditioning Prior to Multilayer Deposition").

8. The shuttering obscuring the substrate table was moved such that the flux from both sources was incident at the table. The substrates were rotated past the sources producing an alternating structure of Pt and Co layers. The first layer being Co and last layer being Pt, a structure of 10 layers in total was achieved in 5 table rotations. The table rotation was 6 rpm, with constant rf power applied to the Co electrode to achieve a deposition of a 3 Å Co layer per substrate pass. Constant dc power was applied to the Pt sputter electrode to achieve a 8 Å thick Pt layer per pass.

400 W of rf power was used to establish a self-bias of −510V with respect to ground potential over the Co target. 120 W of dc power was applied to the Pt sputter electrode, establishing a bias of −405V over the Pt target, and an induced bias of minus 2–5V on the substrate table with respect to ground potential. The gas metering and substrate-electrode separation was as described hereinabove. ("Multilayer Deposition"). The coercivity shift of the minor loop (due to exchange coupling) as a function of temperature is given in Table 4.

EXAMPLE 9

The procedure for fabrication of the Memory Layer was as described in Example 7, for the first multilayer. A heat treatment was then applied in the following manner:

The sample was placed on a copper block at 165° C. for 10 minutes. It was then removed and placed on a steel block at room temperature and allowed to cool to room temperature.

Figure 5A:
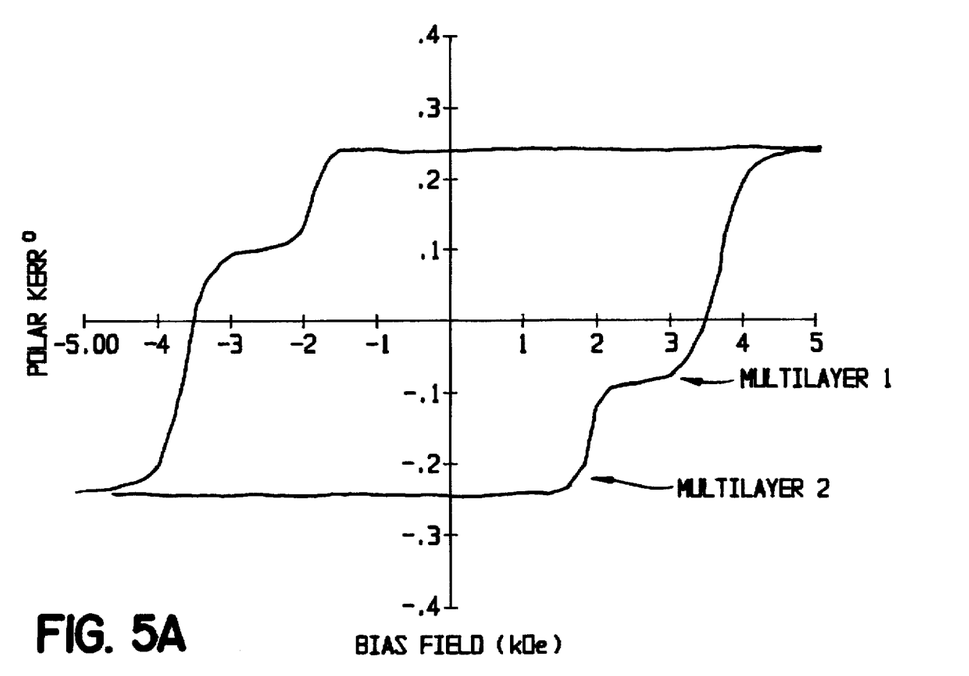
Figure 5B:
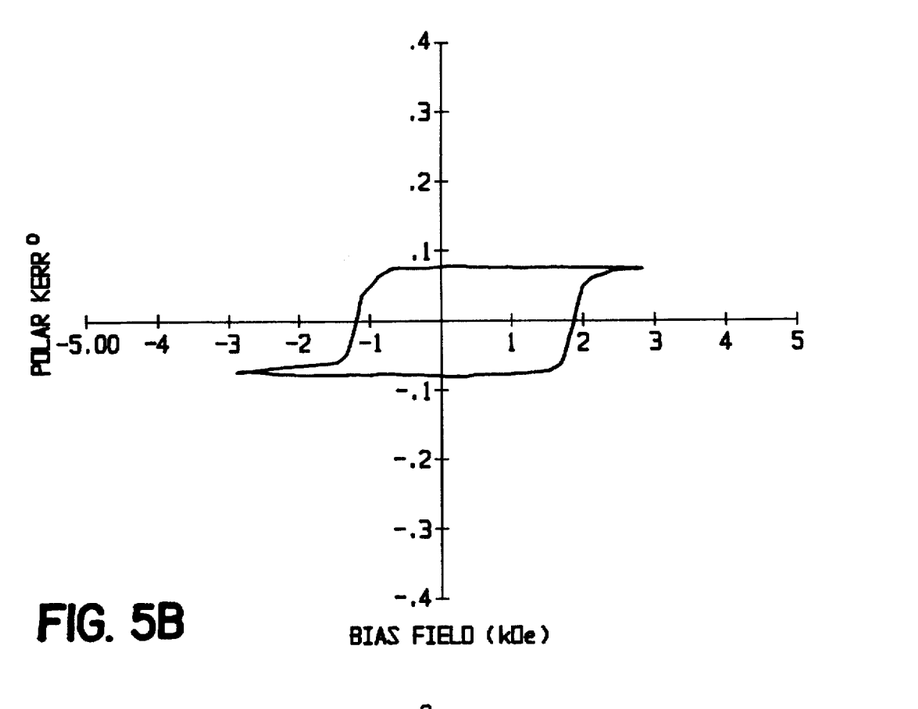

Similarly the procedure for fabrication of the Reference Layer was as in Example 7 for the second multilayer with the exception that the individual Pt layer thickness in this multilayer was 6 Å, 90 W of dc power supplied to the sputter electrode, the target potential being −376V with respect to ground potential. The major and minor polar Kerr loops for this Example are shown in FIG. 5a and 5b. Table 4 shows the coercivity shift of the minor loop (due to exchange coupling) as a function of temperature.

TABLE 4

The minor loop coercivity shift due to exchange coupling, as a function of temperature

| Temperature | Example 7 | | Example 8 | | Example 9 | |
|---|---|---|---|---|---|---|
| (°C.) | $H_c$ | $\Delta H_c$ | $H_c$ | $\Delta H_c$ | $H_c$ | $\Delta H_c$ |
| 20 | 1.25 | .55 | −1.2 | −2 | 1.5 | 0.35 |
| 120 | .65 | .15 | — | — | 0.90 | 0.10 |
| 150 | .55 | .10 | −0.8 | −1.2 | 0.75 | 0.05 |
| 200 | .28 | .03 | −0.3 | −0.7 | 0.40 | 0.03 |

EXAMPLE 10

First Multilayer

The first layer was fabricated as described in that for Example 4. The sample was removed from the chamber and heat treated according to the following procedure:

The sample was placed in a furnace at 153° C. for 40 minutes. It was then removed and placed on an aluminium block at room temperature and allowed to cool to room temperature.

Second Multilayer

1. The sample was mounted onto a substrate table in the vacuum chamber, and the chamber pumped to a base pressure of $2 \times 10^{-6}$ mb.

2. Pure argon gas was metered into the pumped chamber to attain a pressure of $1.5 \times 10^{-2}$ mb and the system allowed to equilibrate for several minutes. ("Gas Equilibration").

3. A rf planar magnetron source located directly opposite but facing the dc planar magnetron Pt source provided the source of Co flux for production of the desired multilayer structure, the flux from either source obscured by the substrate table of area 2960 cm², positioned centrally between them, 11 cm from each gun. A thin cobalt target was used (8"×4"×1 mm) to enhance the magnetron sputtering effect. With the substrates obscured from both sputter sources, power was applied to each source at the values required for the respective deposition rates of Pt or Co respectively, for fabrication of the multilayer structure the platinum power level was established first. This situation was maintained for several minutes enabling equilibration of the sputter sources at the respective power settings for the required deposition rates. ("Target Pre-Conditioning Prior to Multilayer Deposition").

4. The shuttering obscuring the substrate table was moved such that the flux from both sources were incident at the table. The substrates were rotated past the sources producing an alternating structure of Pt and Co layers. The first and last layers being Pt, a structure of 7 layers in total being achieved in 3.5 table rotations. The table rotation was 6 rpm, constant rf power being applied to the Co-electrode to achieve a deposition of a 3 Å Co-layer per substrate pass. Constant dc power was applied to the Pt sputter electrode to achieve an 8 Å thick Pt layer per pass. Note in this example the spacer structure is formed from the post deposition heat treated last deposited Pt layer of the first multilayer and the first deposited Pt layer of the second multilayer system.

400 W of rf power was used established self-bias of −570V with respect to ground potential over the Co target.

120 W of dc power was applied to the Pt sputter electrode, establishing a bias of –407V over the Pt target and an induced bias of minus 1–2V with respect to ground potential on the substrate table. The gas metering and substrate-electrode separation was as previously described. ("Multilayer Deposition").

Figure 6A:
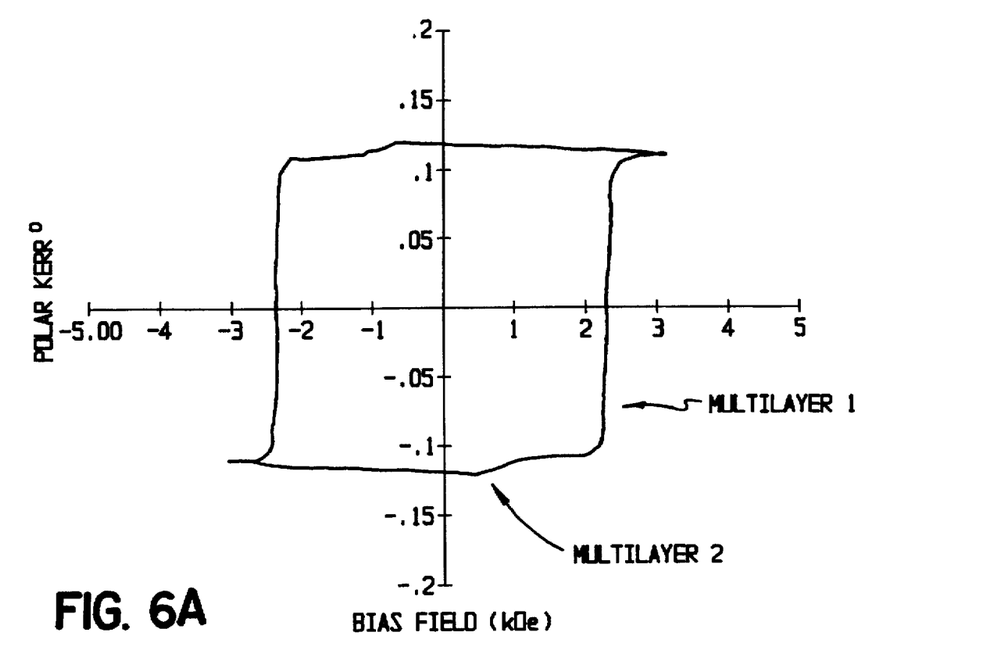
Figure 6B:
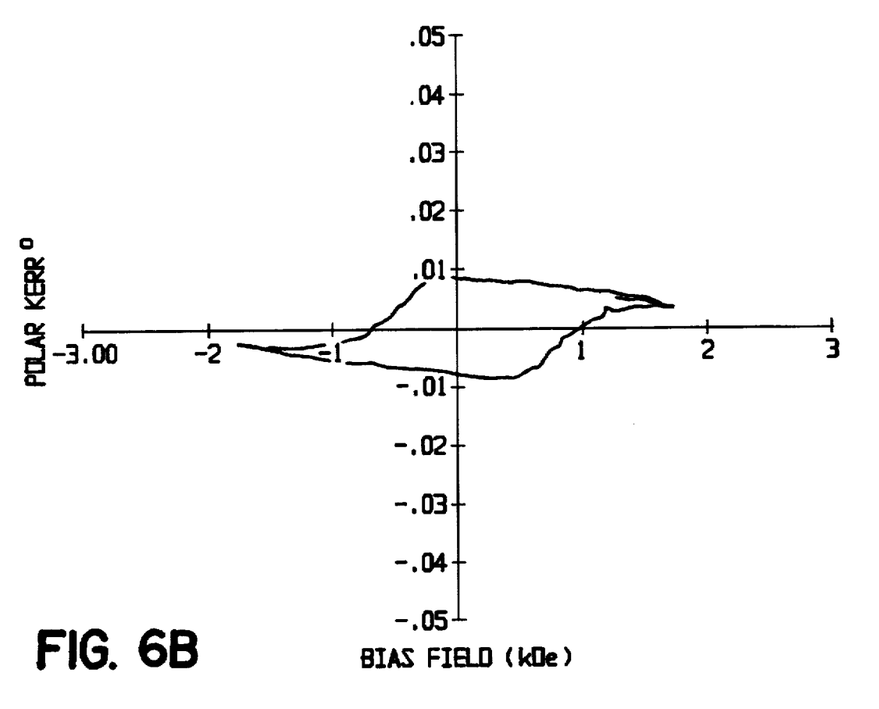

The major and minor polar Kerr loops for the bilayer multilayer system illustrating weak exchange coupling between the layers is shown in FIGS. 6a and 6b.

We claim:

1. A magneto-optical recording medium comprising, a composite multilayer laminate system wherein multilayer films of platinum and cobalt are exchange coupled and have perpendicular magnetic anisotropy, such system having the potential to allow direct overwriting of data, said system comprising a substrate material and at least two multilayer films comprising a platinum layer and a cobalt layer, and wherein there is provided at a multilayer interface a spacer comprising one platinum layer of one or both multilayers or a separately-deposited material, one of said multilayer films having a room temperature coercivity ($H_c$) of 2 to 15 kOe and a low Curie temperature ($T_c$) of 100° C. to 400° C. and known as the memory layer and one of said multilayer films having a low room temperature coercivity of 0.5 to 10 kOe and a high Curie temperature of 175° C. to 500° C. and known as the reference layer, the difference in coercivity and Curie temperature between the two multilayer films being sufficient to permit a direct overwriting process.

2. A magneto-optical recording medium according to claim 1, wherein the $H_c$ (memory layer) minus $H_c$ (reference layer) is greater than, $$\sigma_w/(2M_s(\text{memory layer}) h(\text{memory layer})) + \sigma_w/(2M_s(\text{reference layer}) h(\text{reference layer}));$$

wherein $\sigma_w$ is the exchange coupling strength, $M_s$ is the saturation magnetization and h is the multilayer thickness.

3. A magneto-optical recording medium according to claim 2, wherein $H_c$ of the memory layer is 3–10 kOe.

4. A magneto-optical recording medium according to claim 3, wherein $H_c$ of the memory layer is 3–8 kOe.

5. A magneto-optical recording medium according to claim 2, wherein $H_c$ of the reference layer is 1–6 kOe.

6. A magneto-optical recording medium according to claim 5, wherein $H_c$ of the reference layer is 1.5–4 kOe.

7. A magneto-optical recording medium according to claim 1, wherein $T_c$ of the reference layer is greater than $T_c$ of the memory layer by 75° C. to 100° C.

8. A magneto-optical recording medium according to claim 1, wherein $T_c$ of the reference layer is greater than $T_c$ of the memory layer by more than 100° C.

9. A magneto-optical recording medium according to claim 1, wherein $T_c$ of the memory layer is 150° C. to 300° C.

10. A magneto-optical recording medium according to claim 9, wherein $T_c$ of the memory layer is 150° C. to 200° C.

11. A magneto-optical recording medium according to claim 1, wherein $T_c$ of the reference layer is 250° C. to 500° C.

12. A magneto-optical recording medium according to claim 11, wherein $T_c$ of the reference layer is 200° C to 400° C.

13. A magneto-optical recording medium according to claim 1, wherein the spacer at a multilayer interface comprises a platinum layer of one or both multilayers.

14. A magneto-optical recording medium according to claim 1, wherein the spacer at a multilayer interface comprises separately-deposited material.

15. A magneto-optical recording medium according to claim 14, wherein the separately-deposited material is of platinum or other metal or a dielectric material or a combination of materials.

16. A magneto-optical recording medium according to claim 15, wherein the separately-deposited material is of platinum.

17. A magneto-optical recording medium according to claim 13, wherein the spacer is of average thickness up to 50 Å.

18. A magneto-optical recording medium according to claim 1, wherein the spacer is of average thickness of sub-monolayer thickness to 25 Å.

19. A magneto-optical recording medium according to claim 1, wherein there is provided an interlayer of platinum or other metal or dielectric material or combination of material between the substrate and the adjacent platinum/cobalt multilayer film.

20. A magneto-optical recording medium according to claim 19, wherein the interlayer is of platinum.

21. A magneto-optical recording medium according to claim 19, wherein the interlayer is of average thickness up to 50 Å.

22. A magneto-optical recording medium according to claim 21, wherein the interlayer is of average thickness of sub-monolayer thickness to 20 Å.

23. A composite multilayer laminate system according to claim 1, wherein each cobalt layer has a thickness of 2–5 Å.

24. A magneto-optical recording medium according to claim 1, wherein each platinum layer has a thickness of 3–20 Å.

25. A magneto-optical recording medium according to claim 1, which comprises 2–15 periods of the platinum/cobalt multilayer films.

26. A magneto-optical recording medium according to claim 1, wherein the medium is in the form of a disc.

27. A process for making a magneto-optical recording medium according to claim 1, comprising providing a spacer of average thickness up to 50 Å between two multilayers of platinum and cobalt.

28. A process according to claim 27, wherein the spacer is subject to hyperthermal processing.

29. A magneto-optical recording medium according to claim 14, wherein the spacer is of average thickness up to 50 Å.

* * * * *

UNITED STATES PATENT AND TRADEMARK OFFICE
CERTIFICATE OF CORRECTION

PATENT NO. : 5,702,830
DATED : December 30, 1997
INVENTOR(S) : Joseph MILLER et al It is certified that error appears in the above-identified patent and that said Letters Patent is hereby corrected as shown below:

Column 1, lines 66-67, change "$H_c$ (reference layer) $>H_b >H_c$ (memory layer)" to read
--$H_c$ (reference layer) $> H_b < H_c$ (memory layer)--

Column 3, line 47, after "anisotropy" insert --and the--.

Column 4, line 35, change

"$\sigma_w/[2M_s$ (memory layer) h (memory layer)] $\sigma_w/[2M_s$ (reference layer) h(reference layer)];"

to read
    --{$\sigma_w/[2M_s$ (memory layer) * h (memory layer)]} + $\sigma_w/[2M_s$ (reference layer) * h (reference layer)]}.--

Column 6, line 52, change "1 Å" to read --1Å/s--.

Column 16, line 12, change "102V" to read --1-2V--.

UNITED STATES PATENT AND TRADEMARK OFFICE
CERTIFICATE OF CORRECTION

PATENT NO. : 5,702,830
DATED : December 30, 1997
INVENTOR(S) : Joseph Miller, et. al.

It is certified that error appears in the above-identified patent and that said Letters Patent is hereby corrected as shown below:

Column 17, line 35, change "$1.5 \times 10^{2}$" to read -- $1.5 \times 10^{-2}$ --.

Signed and Sealed this

Fourteenth Day of December, 1999

Attest:

Q. TODD DICKINSON

*Attesting Officer*     *Acting Commissioner of Patents and Trademarks*